Nov. 2, 1954

H. E. METCALF 2,693,267

FRUIT ORIENTATION DEVICE

Filed June 10, 1949

INVENTOR.
HERBERT E. METCALF
BY
Herbert E. Metcalf
Attorney

Nov. 2, 1954   H. E. METCALF   2,693,267
FRUIT ORIENTATION DEVICE
Filed June 10, 1949   2 Sheets-Sheet 2
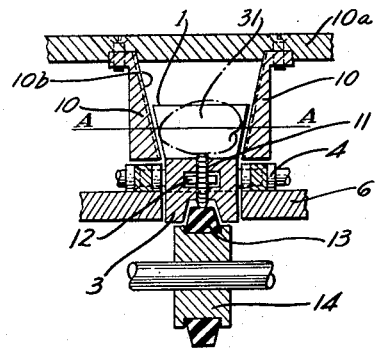
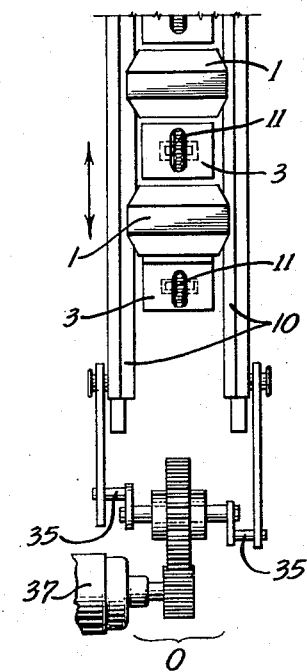
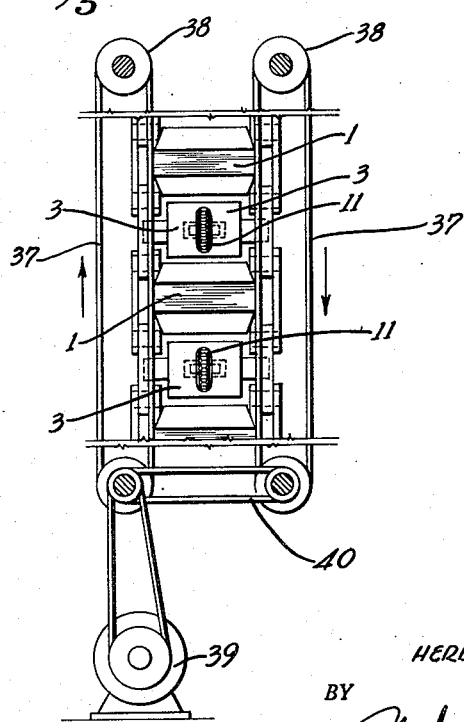
INVENTOR.
HERBERT E. METCALF
BY
Herbert E. Metcalf
Attorney

United States Patent Office 2,693,267
Patented Nov. 2, 1954

2,693,267

FRUIT ORIENTATION DEVICE

Herbert E. Metcalf, Los Angeles, Calif., assignor to S & W Fine Foods, Inc., San Francisco, Calif., a corporation of California Application June 10, 1949, Serial No. 98,243

9 Claims. (Cl. 198—33)

My invention relates to fruit orientation devices and, more particularly, to devices used for turning indented fruit with the stem indent down in order to be in a desirable position for a pitting or similar operation.

It has been proposed before (United States patent to Carroll, Patent No. 2,220,511, dated November 5, 1940) to place an indented fruit in a receptacle having a fruit revolving member in the bottom thereof, this member projecting sufficiently into the receptacle to revolve the fruit in a vertical plane, except when the stem indent registers with the fruit revolving member. When this happens, the fruit ceases to revolve even though the fruit revolving member continues to rotate, due to the reduction of friction between the driving member and the fruit as the weight thereof is mostly taken on the receptacle bottom.

Carroll utilized a wheel revolving in a vertical plane as the fruit revolving member. Other means such as oscillating or revolving wires and the like have also been proposed. In any event, when the fruit is revolved in a vertical plane, a small but significant percentage of fruit having indents suitable for orientation fail to become properly orientated. This is because fruit that is elongated along the indent-tip axis tend to assume a relatively stable rotative position with the fruit revolving on the fruit driving member with the indent-tip axis horizontal and substantially at a right angle to the direction of motion of the fruit driving member relative to the receptacle.

Given lots of indented fruit such as cherries, provided for orientation, contain a small percentage of fruit which because of malformation, such as shallow or practically non-existent indents; pseudo indents due to natural dimpling at places other than the stem indent; or mashed fruit, for example, never can be properly orientated. The number of elongated fruit, however, varies from a negligible amount in certain varieties to a very high percentage in other varieties. A given orientation set-up suitable for cherries that are predominately spherical, for example, will give a satisfactory orientation percentage of 90% and higher, whereas with elongated fruit the same device may not give over 60–70% orientation.

It is an object of the present invention to provide a means for preventing a fruit being rotated in a receptacle by an orientation member, from maintaining a stable position with the indent-tip axis horizontal, so that a higher percentage of over-all orientation may be obtained.

Carroll, for example, remedied this difficulty by transferring the fruit in its final position in one receptacle to a second receptacle in which the fruit driving member was positioned at a right angle to that in the first receptacle so that the fruit formerly being rotated on a horizontal indent-tip in the first receptacle generally could be oriented by the first one-four or three-fourths revolution of the fruit after it was placed in the second receptacle. However, when the fruit is to be kept in the same receptacle during the entire orientation time, this expedient cannot be utilized.

It is a further object of the present invention to provide a fruit restraining means in which an entire orientation cycle can take place, this fruit restraining means being constructed and arranged to tend to prevent fruit from assuming a stable rotational position with the indent-tip axis horizontal, or, if such a position has been assumed, to tend to disturb this position so that the fruit can be orientated. It is another object of the invention to accomplish the above object in a construction that can be made stationary as in a single stage orientator, or in a device capable of being progressed over a path, as by a carrier, either intermittently or continuously operated.

Briefly stated, the present invention includes a composite fruit recess in which the bottom, front and rear members are tied together, but wherein the side members are the recess are separate. Means are provided to create relative movement between the bottom, front and rear members, and the separate side members.

When a wheel or similar indent orientation device is positioned in the bottom of each recess, and when the fruit is rotated by the orientation device in generally vertical planes for orientation of the fruit, the contact of elongated fruit with the relatively moving sides will tend to prevent the fruit from maintaining a stable position with the tip-indent axis of the fruit normal to the plane of rotation of the wheel or similar device. The action thus increases the percentage of orientation of elongated fruit without in any way interfering with the proper orientation of generally spherical fruit.

My invention may be more fully understood by reference to the drawing showing several embodiments of the present invention as applied to a carrier of the general type shown, described and claimed in the copending Doering, et al., application, Serial No. 104,124, filed July 11, 1949, now Patent No. 2,609,913.

In the drawings:

Figure 2 is a diagrammatic cross sectional view taken as indicated by the line 2—2 in Figure 1.

Figure 3 is a diagrammatic top view showing oscillated side plates.

Figure 4 is a view similar to Figure 3 showing continuously moved side plates.

Figure 1:
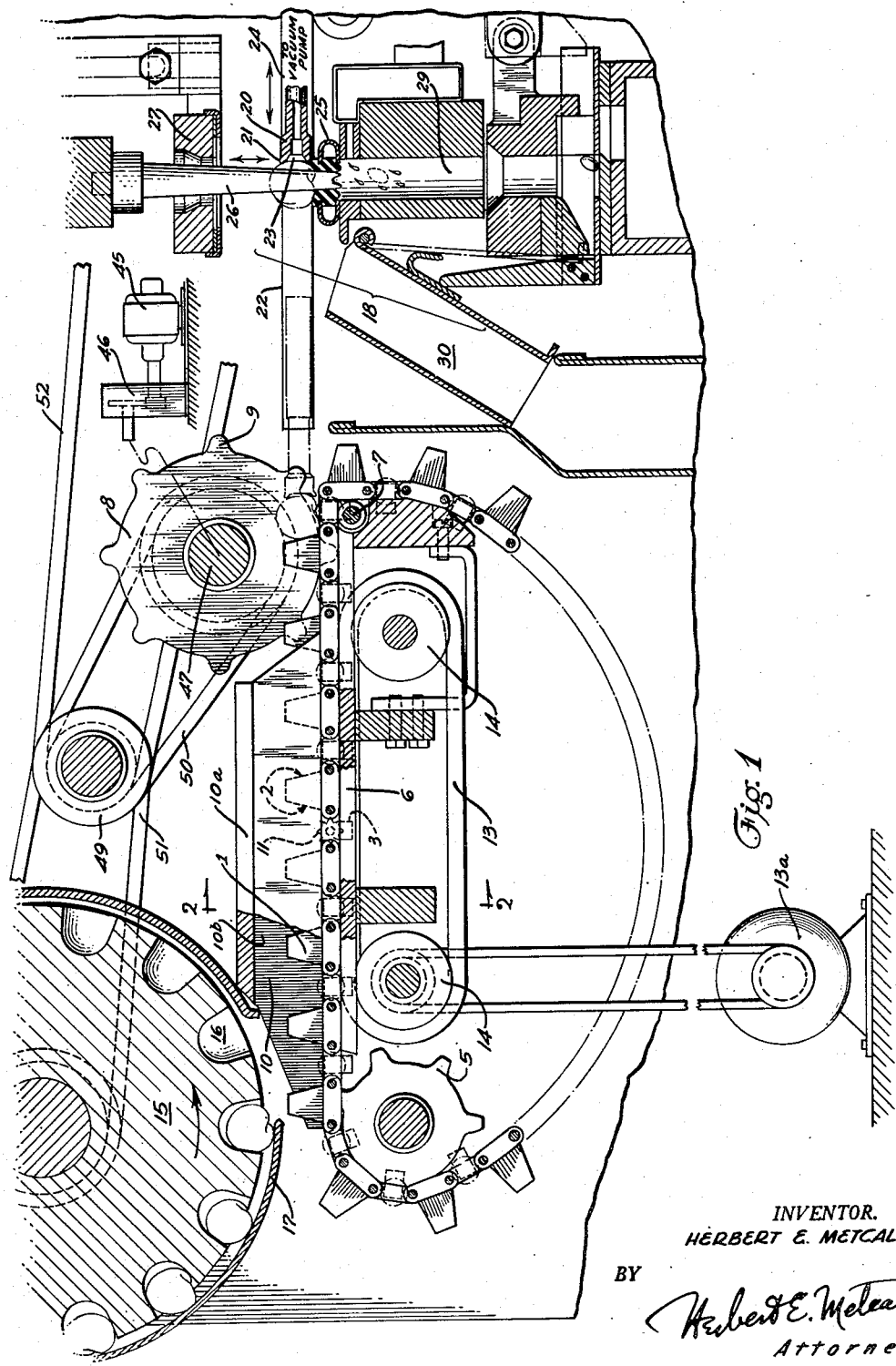
Figure 1 is a diagrammatic vertical sectional view of an orientation carrier embodying one preferred form of the present invention wherein the sides of the fruit receptacles are stationary.

Referring first to Figure 1, a carrier is formed of a plurality of spaced cross bars 1 having inclined flat faces 2 separated by a bottom member 3. Bottom members 3 are connected to bars 1 by chain links 4, the carrier being thus formed into an endless chain. This carrier passes around an idler sprocket 5 at the input end, then passes over horizontal sills 6 (Figure 2) with links 4 sliding on these sills to provide a horizontal path during the carrier progression.

At the output end of this path the carrier passes over a small diameter roller 7 (Figure 1). Just in front of the roller is positioned a drive gear 8 having teeth 9 engaging links 4 as they rotate, thus progressing the carrier.

The leading surface 2 of one bar 1 and the trailing surface 2 of the next bar form the front and rear walls only of fruit receiving recesses with members 3 forming the bottom.

The sides of the recesses are formed by side plates 10 extending along the sides of the bars 1 when these bars are progressing on the horizontal slides 6. Side plates 10 are suspended from plate support 10a, and the inner faces of plates 10 are also preferably slightly inclined to form a composite fruit receiving recess with the cross bars 1 and bottom members 3 of inverted truncated pyramidal shape. Also the side plates 10 are preferably provided with vertical ridges 10b. In Figures 1 and 2 the side plates 10 are stationary while the bars and bottom members are being progressed.

Orientation may be accomplished in this case by a Carroll type wheel 11 mounted on a floating axle 12 in each bottom member 3, projecting above the bottom member and frictionally driven while on the horizontal portion of the carrier path by contact of the lower wheel periphery with an endless belt 13 as shown in Figures 1 and 2. The belt 13 is driven by pulleys 14 in any convenient manner as by a motor 13a, preferably in a direction throwing the fruit against the rear bar surface in each recess when the fruit is being rotated by a wheel 11.

Fruit is loaded at one end of the horizontal path as by a loading drum 15 provided with peripheral pockets 16 therein, filled on top with fruit, the fruit being held in the pockets by a slide 17 terminating over a recess formed when two rising bars 1 reach the horizontal path at the beginning of side plates 10.

After passage over the horizontal path, the fruit may be removed from the recesses after orientation by a vacuum transfer device 18 which is no part of the present invention, being shown, described and claimed in a copending Doering, et al., application, Serial No. 105,858, filed July 11, 1949, now Patent No. 2,635,662. This transfer device will next be briefly described.

As the carrier breaks over roller 7, the leading bar 1 passes around the roller 7 to open the front of the recess between the bars so that a fruit therebetween resting on bottom 3 can be easily removed horizontally along the line of carrier progression.

A transfer member 20 is provided having a vertical surface 21 facing the opened recess, this transfer member being reciprocated by conventional means in a slide 22 to a point where it will closely approach or touch the side of a fruit in the open recess on the carrier. Surface 21 has an aperture 23 therein positioned to contact the equator of the average fruit, and as transfer member 20 approaches the fruit, suction is applied to the aperture through flexible tube 24 so that the fruit in the recess sticks to the surface 21 and is transported to the other end of travel of transfer member 20. Here the fruit is positioned over a pitting rubber 25 of conventional design and is pitted by a pitting knife 26 moving downwardly through a stripper plate 27 to push the cherry pit through the stem indent and rubber aperture 28 into a pit chute 29, as is customary in mechanical cherry pitters.

As the transfer member 20 starts back for the next cherry, the cherry just pitted is pushed over a discharge chute 30 with suction removed or with positive suction substituted, so that the fruit can fall freely off the surface 21 into the discharge chute 30.

The next cherry is then picked from the next opened recess and the cycle is repeated.

The action of the present invention is shown in Figures 2–4, inclusive. In Figure 2 an elongated fruit 31 is shown as rotating on the wheel 11 on its long indent-tip axis A—A. In the absence of forces tending to disturb its position it will tend to stay in that general position until transferred to the pitter, thereby lowering the percentage of properly orientated fruit. However, the fruit is not exactly balanced on the wheel as it rotates, but rocks or wobbles laterally to touch side plates 10 as it rotates. In the presently described device when the carrier bars are being progressed with side plates 10 stationary, relative movement exists between the side plates 10 and the rest of the fruit recess. When one end or the other of the fruit touches these side plates, this relative movement tends to drag on the end of the fruit to turn the fruit axis A—A to be more nearly in line with the plane of wheel rotation. The stability is upset so that a greater posibility of orientation of the elongated fruit is obtained by later rotation in other planes. The ridges 106 aid in turning the fruit by increasing the drag thereon. In Figure 2 the side plates 10 are shown as being held stationary as the bars 1 are progressed with the fruit between them. In the device of Figure 3, the side plates are oscillated as by an oscillation mechanism O. The side plates 10 can be oscillated together, or as preferred, in opposite direction as by cranks 35 driving rods 36 as by motor 37 to turn the fruit in a horizontal plane. In Figure 4 the side plates 10 are in the form of endless belts 37 preferably driven in opposite directions over pulleys 38 driven by belt motor 39. The two belts 37 are cross connected by cross belt 40. As in side plates 10 the sides of belts 37 are preferably roughened or ridged vertically.

The power drive for the machine is, for example, from a main motor 45 through a reducing gear 46 to a gear shaft 47 on which gear 8 is mounted. Gear pulley 48 drives idler pulleys 49 through idler belt 50 from which drum 15 and the transfer device 18 are driven as by belts 51 and 52, respectively.

It can thus be clearly seen that the use of the present invention will tend to disturb fruit rotating on its long axis, so that a greater probability of orientation is provided, especially when elongated fruit is being processed. Fruit rotation is provided in vertical planes by the wheel and in horizontal planes by the relative movement of the side plates 10 and bars 1. In practice a substantial rise in percentage of orientation of elongated fruit has been obtained.

While I have described my invention as applied to a specific form of carrier and fruit recess for purposes of illustration, it will be understood that the invention may take various forms within the knowledge of those skilled in the art without departing from the spirit and scope of the invention. Furthermore the present invention is equally applicable to fruit recesses utilizing means other than a wheel for providing fruit rotation in vertical planes.

While the present invention has been described as applied to a single carrier, the invention is equally well adapted for use with multiple carrier machines. In the latter case, the side plates 10 or belts 37 will serve as the sides of recesses formed by adjacent carriers.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While, in order to comply with the statue, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

I claim:

1. In combination, a carrier, means for progressing said carrier over a path, a plurality of spaced bars on said carrier, the front surface of one bar and the rear surface of the next bar forming the front and rear of a fruit restraining recess, a plate attached to said carrier positioned to form the bottom of each of said recesses and having a fruit rotating means projecting above the top surface thereof to rotate a fruit placed in said recess, means for rotating said fruit rotating means, and a side member positioned on each side of a plurality of said bars to complete a plurality of said recesses, said side members being supported to provide relative movement between said side members and said bars along the path of said carrier.

2. In combination, a carrier, means for progressing said carrier over a path, a plurality of spaced bars on said carrier, the front surface of one bar and the rear surface of the next bar forming the front and rear of a fruit restraining recess, a plate attached to said carrier positioned to form the bottom of each of said recesses and having a fruit rotating means projecting above the top surface thereof to rotate a fruit placed in said recess, means for rotating said fruit rotating means, and a side member positioned on each side of a plurality of said bars to complete a plurality of said recesses, said side members remaining stationary as said bars and plates are progressed along said path.

3. In combination, a carrier, means for progressing said carrier over a path, a plurality of spaced bars on said carrier, the front surface of one bar and the rear surface of the next bar forming the front and rear of a fruit restraining recess, a plate attached to said carrier positioned to form the bottom of each of said recesses and having a fruit rotating means projecting above the top surface thereof to rotate a fruit placed in said recess, means for rotating said fruit rotating means, and a side member positioned on each side of a plurality of said bars to complete a plurality of said recesses, said side members being movable along a line parallel to that of said carrier progression at a different rate than that of said carrier.

4. Means defining a composite fruit orientating recess comprising a bottom, means forming front and rear walls of said recess connected to be moved with said bottom, a fruit rotating means movable with said bottom and projecting above said bottom, means for rotating said fruit rotating means, a side wall on each side of said front and rear walls to complete said recess, and means for providing relative movement between said front and rear walls and said side walls.

5. Apparatus in accordance with claim 4 wherein said front and rear walls and said side walls are contoured to form a composite recess of inverted truncated pyramidal shape.

6. In combination with means defining a fruit orientating recess having a bottom, front and rear and side walls, means for progressing said recess over a path, fruit rotating means cooperatively positioned in the bottom of said recess to support and rotate a fruit placed in said recess in a vertical plane, and means for providing relative movement between said bottom, front and rear walls, and said side walls to tend to rotate said fruit in a horizontal plane along said path.

7. In combination, a pair of spaced vertical members, a pair of spaced vertical cross members positioned at a right angle to and first vertical members and connected by a bottom element, a fruit revolving member positioned to project upwardly through said bottom element, said members and said bottom element forming a composite fruit orientating recess, means for relatively moving said cross members and bottom element and said first mentioned vertical members, and means for driving said fruit revolving member.

8. In combination, a pair of first spaced wall members, a second pair of spaced wall members at right angles to said first members and connected by a bottom element, said members and said bottom element being positioned to define a fruit restraining recess of substantially square horizontal cross section, fruit revolving and supporting means positioned substantially centrally at the bottom of said recess and projecting upwardly through said bottom element, means for driving said fruit revolving member, and means for moving one pair of said members relative to the other pair.

9. Apparatus in accordance with claim 1 wherein said side members are provided with a plurality of vertically extending ridges facing the interior of said recesses.

References Cited in the file of this patent

UNITED STATES PATENTS

| Number | Name | Date |
|---|---|---|
| 1,742,653 | Goranson | Jan. 7, 1930 |
| 2,238,970 | Carroll | Apr. 22, 1941 |
| 2,265,515 | Carroll | Dec. 9, 1941 |
| 2,298,614 | Carroll | Oct. 13, 1942 |
| 2,387,709 | Ashlock | Oct. 30, 1945 |
| 2,471,479 | Coons | May 31, 1949 |